Figure 1:
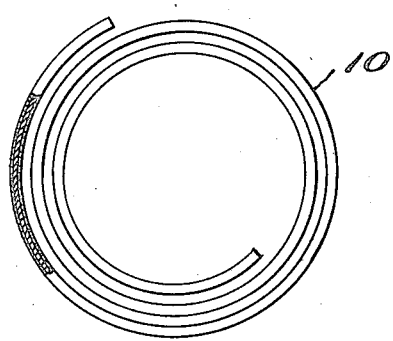

Oct. 30, 1923.

B. B. GOLDSMITH

PERMANENT INK CARTRIDGE

Filed Aug. 8, 1922

1,472,067

2 Sheets-Sheet 1

Byron B. Goldsmith
Inventor

By his Attorney

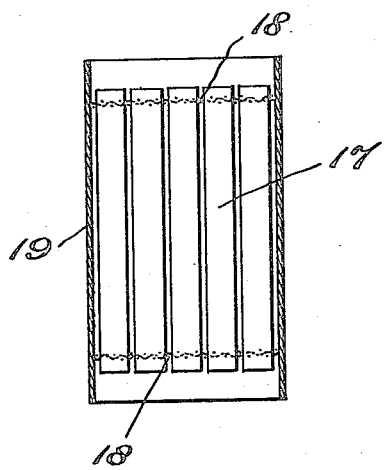
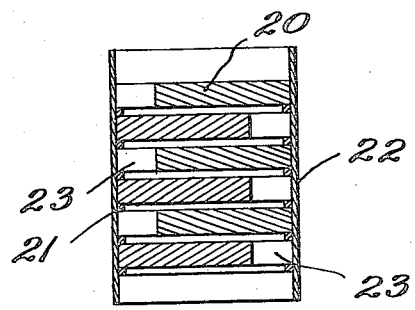
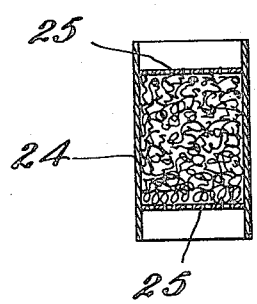
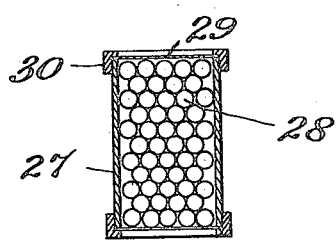
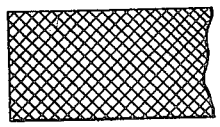

Patented Oct. 30, 1923.

1,472,067

UNITED STATES PATENT OFFICE.

BYRON B. GOLDSMITH, OF NEW YORK, N. Y.

PERMANENT INK CARTRIDGE.

Application filed August 8, 1922. Serial No. 580,559.

*To all whom it may concern:*

Be it known that I, BYRON B. GOLDSMITH, a citizen of the United States, residing in New York, county and State of New York, have invented a certain new and useful Improvement in Permanent Ink Cartridges, of which the following is a specification.

The many inconveniences and disadvantages of transporting and storing ink in liquid form are well recognized, and various ways have been proposed for avoiding them by supplying apparatus whereby solid ink-producing material might be supplied to the consumer in such a way as to make it possible to produce a liquid ink by the mere addition of water when and where the ink was needed.

The means hitherto produced for this purpose have not been adapted to the manufacture of a record ink, by which is meant an ink capable of meeting the standard tests for permanency. Aniline colors have generally been used in this connection, and these, of course, are of a fugitive nature. On the other hand, it is not practicable to use an ordinary record ink merely dried, either as a powder or in compressed form, because such an ink would undergo a process of oxidation which would interfere with its solubility in water.

The present invention relates to an article which can be used to produce a liquid record ink by the mere addition of water. Such inks generally consist of a chemical composition containing iron and tannic or gallotannic acid or a similar substance. To this aniline dye may be added to increase the intensity of the color. In addition it is usual to add a certain amount of gum, some preservative, and finally a substance helping to keep the ink or solution and prevent sedimentation. Of course there are also compounds other than iron and tannic acid or its equivalent which are used to make record inks and are mentioned in the literature of the subject. The present invention, is therefore, not limited to iron and tannic acid inks; although, for convenience, the following description is made to refer to inks of this class.

I have discovered that if ink producing elements are constructed in such a manner as to prevent chemical combination of the iron and the tannin or its equivalent until the water is added, these will produce as good and as permanent a record ink as any of the liquid inks of commerce.

This may be done in various ways. One method is to mix all the ingredients together without permitting the chemical reaction to take plae. The mixture may then be formed into the desired shape or shapes or may be attached to a foundation or backing having the shape or shapes desired. Another method is to divide the ingredients into two or more groups, the iron and tannin being in separate groups, and to isolate these groups either in separate masses or attached separate to a backing or foundation; care being taken to prevent chemical combination until one is ready to produce liquid ink by adding water. In any case, when water is allowed access to the ingredients so prepared, they are dissolved and the chemical reaction takes place which produces the ink.

In the first method above mentioned, where all the ingredients are mixed together and formed into the shape or shapes desired without permitting chemical reaction to take place, it will be necessary to take advantage of the properties of the various ingredients. For instance, I have found that where copperas (iron sulphate) and tannic acid are used, if the tannin is dissolved in a solvent which does not dissolve the copperas no reaction takes place. In this case the solution of tannin serves admirably as a binding medium for all the other ingredients of the ink. Of course, a binding medium may be used which dissolves neither the tannin nor the copperas, as no reaction will then take place. Any medium used must, naturally, be soluble in water, where liquid-ink is to be made by adding water. The use of other final solvents is, however, within the scope of the present invention.

Alcohol may be used to dissolve the tannin, making a more or less thick paste, and it is a good plan to add the aliline dye to this paste, where aniline dye soluble in alcohol is used. The aniline dye should be dissolved in the alcohol before adding the tannin. Where the aniline dye used is insoluble in alcohol it can be finely ground and mixed with the tannin paste, which may then be pressed into any shape desired or applied as a coating to a suitable backing or foundation. It is best to use anhydrous alcohol so as not to dissolve any of the copperas, but it is practicable, and is within this invention to use alcohol having some water in it. Suitable solvents other than alcohol may also be used.

Another plan of procedure is as follows. A very heavy paste of gum and water can be made and may be used to consolidate all of the ingredients or any two or more. This is possible because, although a slight reaction may thus be produced between a part of the copperas and tannin (due to the water) there will, nevertheless, be so little water present as to leave practically all the iron and tannin uncombined. If a gum or a substitute for gum is used which is soluble in alcohol as well as water, this solution may also serve as a binder for the various ingredients. Any method of combination may be employed in which substantially the same results are accomplished, and whereby no substantial chemical union is permitted prior to adding water to form the liquid ink. It is to be understood that the composition made by any method can be given any shape, and the ink producing element may consist of a single mass or article or be made up of a number of such suitably assembled. The composition or assemblage of compositions may be used as a coating on one or more foundations or backings of suitable shape or shapes.

Where the ingredients are divided into isolated groups in solid shape or attached in such groups to a suitable foundation or backing, so many different modes of procedure are possible that they cannot all be described. Assuming, for instance, an ink-producing material having five ingredients, viz:—tannin, copperas, aniline dye, gum and a substance to prevent precipitation, each can be kept separate from every other, while all are suitably assembled to form an ink-producing element or cartridge. Each ingredient will then form a "group" in the broadest sense of my claims. When such an ink-producing element is suitably treated with water a good permanent record ink will be readily and conveniently produced.

It is not however necessary to keep all the ingredients apart, since there is no tendency to chemical union except as between the tannin and copperas. For instance, the aniline may be mixed with the tannin and the gum with the copperas, while the substance used to prevent precipitation may be joined with either mixture. Other combinations are, of course, also possible. In carrying out this branch of my method, however, it is preferred to keep the tannin and the copperas in separate groups, unless they are mixed together in the same group in a manner to prevent any substantial amount of chemical combination, as already described above.

Figure 2:
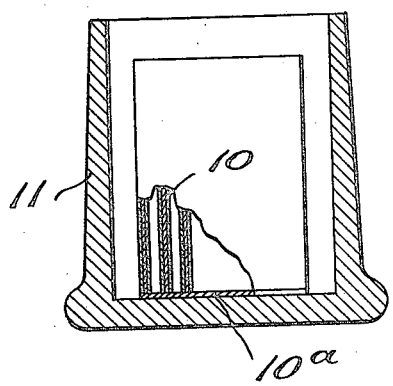
Figure 3:
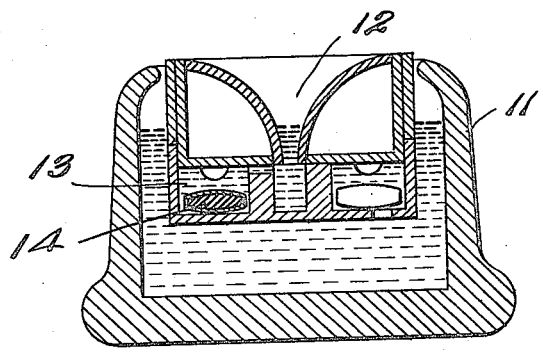
Figure 4:
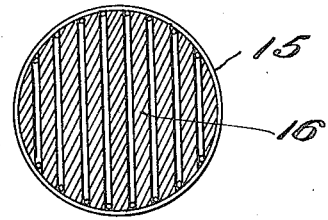

The present invention is illustrated in a few of its preferred forms in the accompanying drawings wherein Figure 1 is a plan view of a spiral cartridge, Figure 2 is a vertical sectional view of a complete ink stand incorporating the cartridge of Figure 1, Figure 3 is a similar view of one mode of using my ink producing material in tablet form in a complete ink stand, Figures 4 and 5 show a plan view and a vertical sectional view of two other modified arrangements, Figure 6 is a sectional view of another form of cartridge using tablets, Figure 7 is a sectional view of a form using filamentary material, Figure 8 is a similar view of a form using a collection of loose masses, and Figure 9 is a view of a piece of netting used as an element in building up a cartridge.

The present invention is not confined to any particular ink composition, and the principles of the invention can, therefore, be made clear by reference to two illustrative examples.

A good ink can be made of copperas, and tannin, to which is added aliline dye to add intensity of color, gum to give body, and sodium bisulphate or equivalent chemical to prevent sedimentation. This last takes the place of the hydrochloric acid commonly used in liquid inks, which is of course not available in solid form.

Another good ink which may be mentioned as an example is composed of copperas, pyrogallic acid, anilin dye and gum with or without an ingredient to prevent sedimentation, such as sodium bisulphate or an organic acid like citric or tartaric acid. In this case there may be anywhere from two to five groups of the dry ingredients separately applied in the cartridge. The cartridge is easier to make if the copperas and pyrogallic acid are kept in different groups.

The method involved in the present invention where separate groups are used is to cause water to come in contact with separated groups of the ink ingredients which are chemically uncombined prior to solution.

From the construction of the different figures shown in the drawings, it will be seen that they are so made that ink will be produced by passing water through them. While this is the simplest method perhaps, there are other ways of using the cartridge. For instance, it may be placed in a receptacle into which water is poured and after contact has been established for a sufficient length of time, the water is poured out or run off as desired. It is to be understood that the cartridges hereinafter described and others which can be made in conformity with the invention, may be used in any of these ways.

Described in general language, the cartridges are fashioned so as to provide one or more passages for guidance of the moving liquid within which are located the ingredients of a practical stable ink chemically uncombined. These passages may be artificially formed in solid masses of the grouped ingredients, or they may constitute merely the spaces between such bodies, or they may be provided in either of these ways by the use of supporting bodies of inert material more or less of whose surfaces carry the constituent groups in positions appropriate to receiving the successive or simultaneous dissolving action of the passing water.

In Figures 1 and 2 are shown a cartridge formed of a band of inert or neutral material 10 wound so as to form a flat spiral passing from circumference to center, through which the solvent may be made to pass. On this spiral may be placed a coating of the mixed uncombined ingredients or the spiral can be made of inert material and the passage filled with pieces of the ingredients or the various groups of ink-producing constituents may be borne upon the walls of the passage so formed in any convenient arrangement. One practical arrangement, is to arrange the constituents in two groups and to coat one face of the band with one group and the other face with the other group. The water entering the spiral passage would thus pass between the two groups close together and an efficient dissolving and combining action would result. Any desired means may be employed for holding the spiral together while preserving passage for the solvent. The spiral should be closed at the bottom as shown at 10$^a$ by a disc sufficiently heavy to prevent floating.

Of course, there are many conceivable modifications. More than one spiral can be used, made from as many bands. The groups of constituents can all be on the same side arranged next to each other or alternating. The spiral can also be made of solid material in the spiral shape instead of in bands coated and bent.

The coating may be produced by simple application of a layer of the material, or the inert body may be of a nature to be more or less impregnated.

A cartridge of this kind can be used in various ways. In Figure 2 is shown one method in which the cartridge with one end closed is merely set on its closed end in a suitable vessel 11. When water is poured into the vessel outside of the cartridge it finds its way through the spiral passage in the cartridge to the center, where it can be dipped into as in an ordinary inkstand.

In Figure 3 is shown a vessel 11 containing a body of water in which floats a container having a dipping space 12 and, under this, a succession of chambers 13 containing tablets 14 respectively formed of different groups of ink-producing ingredients. The water in finding its level is obliged to pass through the chambers 13 and around the tablets 14 on its way to the dipping space 13, where it arrives in the form of a practical ink.

In this form, the tablets may all be made alike from a mass containing all the ingredients. Whether so made, or made each of a separate group of ingredients, such tablets need not necessarily be composed entirely of ink-producing material. Each may have a neutral core covered with the ink-producing material, and I have indicated this in the representation of one of said tablets. It is to be understood that, wherever tablets, plates or the like are herein mentioned this compound structure with a neutral core is included. It is, of course, understood that there can be more than one piece of ink producing material in any compartment.

In Figure 4 is shown a cartridge comprising a cylindrical open-ended support 15 carrying parallel plates 16, between which the passages are formed which receive the solvent. These plates are either made of the different groups of ingredients respectively or have their faces coated therewith. By properly proportioning a cartridge so constructed, ink can be made by simply pouring water through the cylinder 15. This form can also be made by having plates of neutral or coated material and the spaces between them filled with pieces of the ingredients so packed that liquid can pass between and around them.

In Figure 5 the active bodies are rods 17 held by partitions of netting 18 within the exterior tube 19. Here also the surface of the rods may be inert or contain ink producing material, and the spaces between them filled with additional ink producing elements arranged so as not to clog the passages.

In the form shown in Figure 6 the ink-producing material (arranged in groups or otherwise) takes the form of discs 20 held apart by spacing rings 21 within the tube 22. These discs have openings 23 on alternately opposite sides so that water passing through the tube will follow a back and forth path between the discs, thus providing a relatively long percolating passage. The discs may either be made entirely of the ink-producing material (or group of ingredients) or the same may be applied as a coating to an inert core.

In Figure 7, the cartridge comprises a tube 24 containing two parallel perforated partitions 25, between which is confined a filamentary mass 26 (threads, hairs or the like). This mass may be impregnated or coated with the mixed uncombined ingredients, and when water is allowed to percolate through the mass, the ingredients will be dissolved and will combine, forming the ink; or different parts of the mass may carry each one group of ingredients.

In Figure 8 is shown a tube 27 containing loose masses 28 each composed of or coated with the active material. This last may, of course, be a mixture of all the ingredients uncombined or different groups of ingredients may be placed in or on each separate mass. These masses are confined by closing layers 29 of permeable material, preferably of an absorbent nature, such as muslin or the like. This filters out any dust or broken particles.

These cartridges can be used in so many different pieces of apparatus, in ink stands or fountain pens or in apparatus for making ink that applicant will not go into this phase of the matter as it has no bearing upon the invention.

One particularly convenient and useful element which can be used in a great variety of ways in building up an ink cartridge is shown in Figure 9. This represents a section of a network of any convenient character, either coated or impregnated with any one of the ink-producing mixtures above described. Of course such a netting might be used to carry the complete mixture uncombined or different elements made of such a netting may carry each a single ingredient or incomplete group of uncombined ingredients.

What I claim is—

1. The process of forming a stable ink which consists in providing separate groups of the ingredients of such ink in dry form, and causing a suitable solvent to flow past said groups in succession, whereby the ingredients capable of combination are brought together for the first time by and in the solvent.

2. An ink cartridge having one or more passages for receiving solvent and uncombined ink ingredients contained in the passage or passages.

3. A cartridge as in claim 3 hereof wherein one or more of the ingredients serves as a binder for their consolidation.

4. In an ink cartridge arranged to permit passage of a solvent therethrough, a plurality of masses placed in the destined path of the solvent, the surfaces of said masses being composed of uncombined ink ingredients.

5. In an ink cartridge arranged to permit passage of a solvent therethrough, a plurality of separate groups of uncombined ink-producing ingredients placed in the destined path of the solvent.

6. An ink cartridge having one or more passages for a solvent, the walls of which passages carry separate masses each constituting a group of uncombined ink-producing ingredients.

7. An ink-cartridge having one or more percolating passages formed by assembled bodies whose surfaces are composed of mixed and uncombined ink-producing ingredients.

8. An ink cartridge having percolating passages formed by assembled bodies whose surfaces are composed respectively of separate groups of uncombined ink-producing ingredients.

9. A cartridge formed of a spirally wound sheet having its face coated with separate groups of uncombined ink-producing ingredients.

10. A cartridge as in claim 10 wherein the ink-producing material is applied to both faces of the sheet.

11. An element for use in producing liquid ink composed of a neutral base coated with uncombined ingredients of a permanent record ink mixed and consolidated.

12. An ink producing element for the purpose described containing tannin and copperas mixed with a solvent of tannin which will not dissolve the copperas.

13. An ink producing element for the purposes described containing tannin, copperas and aniline dye mixed with a solvent of tannin that will not dissolve copperas.

14. An ink producing element for the purpose described containing tannin and copperas united by a stiff gum.

15. As a step in the process of making an ink-producing element in solid form, mixing with the ingredients a substance capable of dissolving one or more of said ingredients to produce a binder, said substance exerting no material solvent action upon any two ingredients capable of chemical combination in said solvent.

In testimony whereof I have hereto set my hand on this 31st day of July, 1922.

BYRON B. GOLDSMITH.